United States Patent [19]

Walker

[11] Patent Number: 4,662,038
[45] Date of Patent: May 5, 1987

[54] CLIP FIXING FOR RETAINING THIN FILM

[75] Inventor: David P. Walker, Eastbourne, United Kingdom

[73] Assignee: Serac Limited, Chichester, Great Britain

[21] Appl. No.: 731,629

[22] PCT Filed: Aug. 23, 1984

[86] PCT No.: PCT/GB84/00294

§ 371 Date: Apr. 23, 1985

§ 102(e) Date: Apr. 23, 1985

[87] PCT Pub. No.: WO85/01088

PCT Pub. Date: Mar. 14, 1985

[30] Foreign Application Priority Data

Aug. 26, 1983 [GB] United Kingdom ............... 8323006

[51] Int. Cl.4 ..................... A44B 21/00; A47H 13/00
[52] U.S. Cl. ........................................ 24/460; 24/461; 24/462; 160/392; 160/395
[58] Field of Search ............... 24/460, 461, 462, 456, 24/457; 160/392, 395

[56] References Cited

U.S. PATENT DOCUMENTS

| 1,350,027 | 8/1920 | Lane | 160/392 |
|---|---|---|---|
| 1,758,720 | 5/1930 | Sodergren | 160/392 |
| 2,627,311 | 2/1953 | Kaufmann | 160/395 |
| 2,709,489 | 5/1955 | Keebler | 160/395 |
| 2,783,834 | 3/1957 | Brame | 160/395 |
| 2,784,782 | 3/1957 | Young | 160/395 |
| 3,220,469 | 11/1965 | Oehmig | 160/380 |
| 3,818,550 | 6/1974 | Cresswell | 24/461 |
| 4,153,981 | 5/1979 | Stuppy | 160/395 |
| 4,189,880 | 2/1980 | Ballin | 160/392 |
| 4,231,141 | 11/1980 | Derrick et al. | 160/395 |
| 4,233,790 | 11/1980 | Meadows | 52/222 |
| 4,316,308 | 2/1982 | Chatelain | 160/392 |
| 4,341,255 | 7/1982 | Mock | 160/369 |

OTHER PUBLICATIONS

Agra Lock brochure, Agra Tech, Inc., 2131 Piedmont Way, Pittsburg, CA 94565, no effective data is given.

Primary Examiner—Victor N. Sakran
Attorney, Agent, or Firm—Griffin, Branigan & Butler

[57] ABSTRACT

A clip for retaining thin plastics film material (6) in tension formed of a pair of elongate channel members (2,4) removably assembled together in inverted relationship. The film material passes through the fixing between opposed cooperating complementary sinuous surfaces (8,3;9,12) of the flanks of the channel members and in so doing passes over surface portions of the fixing at the entrance to the cooperating surfaces of each flank pair, which are exposed to direct radiation. To avoid degradation of the plastics at these surface portions, means (30,32) are provided on one of the channel members to cover or shield these surface portions from such direct radiation. The covering or shielding (30,32) may be integrally formed with one of the channel members of removably afixed thereto.

9 Claims, 7 Drawing Figures

[4,662,038]

CLIP FIXING FOR RETAINING THIN FILM

FIELD OF THE INVENTION

The present invention relates to a clip fixing for retaining thin film material, particularly plastics material under tension. This form of clip fixing is specially useful in glazing building structures such as greenhouses, home extensions, industrial buildings and solar collectors.

BACKGROUND ART

The use of thin plastics films to form large areas of transparent glazing is becoming an important substitute for glass. This is not only from the cost and weight point of view, but also due to the increased thermal and optical performance that can be achieved with double, triple, and even multiple glazing using this material. Hence thermally efficient structures can now be fabricated at a fraction of the cost and weight of equivalent systems, which use traditional material such as glass, fibre glass or rigid plastics.

A typical panel consists of a framework, usually metal or plastics extrusion, over which the thin film, to form the glazing, is secured and tensioned. Problems have been experienced with this form of glazing mainly due to a short life span brought about by degradation of the plastics material under ultra-violet effects of the sun's radiation, and the lack of an adequate means of securing the film material to the framework.

These difficulties have been overcome to some extent by the introduction of more durable plastics and the use of special clip for tensioning the thin film to the framework, in a dynamic manner, such a clip being the subject of U.K. Pat. No. 1,586,247.

The more durable plastics film which has been introduced in quite capable of withstanding fairly high temperatures, up to 177° C., for short periods of time with a maximum working temperature of perhaps 80° C. depending on film type. It is also capable of lasting for long periods of time, and in excess of fifteen years even when exposed to intense ultra-violet radiation. Under these conditions the film will show a high enough percentage of elongation to break after ten years' exposure to allow a few more years of useful service (the term 'elongation of break' is presently one of the recognised methods by those knowledgeable in the field of plastics film technology for testing the tensile strength of a plastics film. It is a measure of the percentage elongation that can be applied to the film before it fails). As a plastics film ages under outdoor weathering, the percentage of elongation of break, which may be of order of 200% for an exposed piece of film, will drop to perhaps 50% after fifteen years, at which time its impact resistance is virtually gone and it will fail with the slightest application of load, i.e. snow, hail, wind or otherwise.

It has been found, however, that the new generation of plastics films still encounter ageing problems, and it has been shown that the ageing process is most likely to occur in the region where the film exits the chip fixing retaining the thin film at the perimeter of the glazing frame, for example the clip of U.K. 1,586,247 above referred to.

In particular premature failure has been found to occur where the film passes over those surface portions of the clip fixing which are exposed to direct radiation and thus under the influence of high temperatures and ultra-violet radiation.

The result is that such surface portions heat up as they absorb both the infra-red radiation of the sun's spectrum, and also the visible radiation which is converted into thermal energy when it impinges on this part of the clip fixing surface.

On a bright sunny day it is possible for the temperature of the exposed clip fixing surface portions to become substantial. The film passing over the surface is itself therefore elevated to the same temperature, and it is this high temperature coupled with the exposure to ultra-violet radiation that causes the film touching the surface at that point to age extremely quickly, the failures have been recorded within three years on film that would otherwise last for many years.

The result of this simultaneous exposure to U.V. and high temperature being an ageing process which causes the film to become brittle and eventually fail. When tested the value of elongated to break for the film in the region of failure will be below the percentage mark necessary for continuing useful life. Film in very close proximity to this area, however, will still be quite serviceable and when tested exhibit a high value of elongation to break depending on the number of years exposure.

SUMMARY OF THE INVENTION

It is therefore an object of the present invention to provide a clip fixing for retaining and/or tensioning thin film which removes, or at least eliminates to a large degree, the above problems.

According to the invention there is provided a clip fixing for retaining thin plastics film material in tension comprising cooperating surfaces of the fixing designed to retain the film therebetween characterised in the provision of a shield arranged to provide protection from direct radiation to those surface portions of the clip fixing over which the retained film passes and is exposed to said direct radiation.

With this arrangement excessive ageing of the thin film in those areas in contact with the clip fixing and normally exposed to direct radiation, is avoided. Preferably the cooperating surfaces of the clip fixing are provided by the sinuous profiles of the cooperating first and second elongate channels of the clip fixing disclosed in the above-mentioned U.K. Pat. No. 1,586,247 incorporated herein by reference.

In this arrangement the shield is attached to the exterior face of the base of the inverted first channel, to overlap the surfaces of the second channel over which the retained thin film passes, upon exiting the clip fixing.

Advantageously the shield may be removably mounted to the first inverted elongate channel. Preferably this is accomplished by forming the shield of a pliable material, within the first channel adapted to receive in compression fit a complementary pliable protuberance on the shield.

This arrangement is most useful where modification of in-situ existing clips fixings becomes necessary.

BRIEF DESCRIPTION OF THE INVENTION

Embodiments of the present invention will not be described by way of example with reference to the accompanying drawings wherein.

BEST MODES OF CARRYING OUT THE INVENTION

Figure 1:
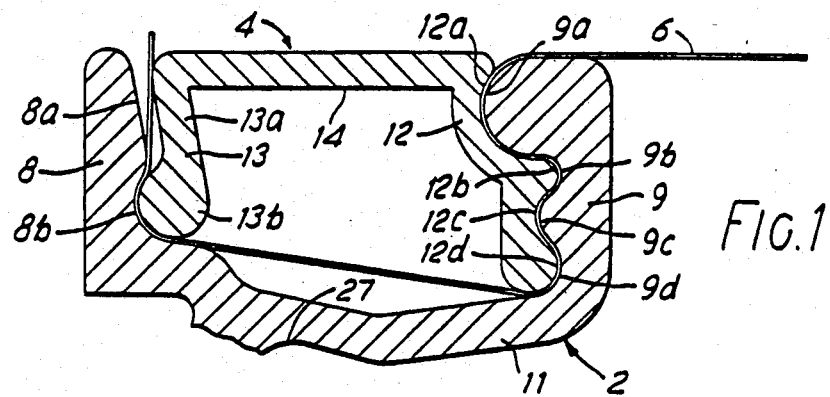
FIG. 1 is a sectional view of a retaining and tensioning clip fixing for thin plastics film according to the prior art.

The tensioning clip shown in FIG. 1 is the subject of U.K. Pat. No. 1,586,247, and represents the present state of the art.

It comprises a channel 2 is assembly with an inverted channel 4, thereby to hold in tension a thin plastics film 6.

The channel 2 has a relatively sinuous internal profile, and comprises opposing vertical flanks 8 and 9, with a lower member 11 uniting the two flanks.

The flank 9 has a radiused upper rib portion or knuckle 9a and an intermediate rib 9c on its inner surface, forming a groove 9b between the rib 9a and rib 9c, and finally a groove between the rib 9c and the base member 11.

The flanks 8 and 9 extend upwardly by the same amount, with the flank 8 having an initial portion 8a constituting a ramp inclined toward the interior of the channel 2, this ramp being followed by a groove 8b substantially opposite or facing the rib 9c in flank 9.

The inverted channel 4 comprises two flank walls 12 and 13 joined by a base member 14. The flanks 12 and 13 of the channel 4 have profiles corresponding to the profiles of the flanks 8 and 9 of the channel 2. Thus the flank 12 of the channel 4 has a groove 12a in its exterior surface with the same radius of curvature as the rib 9a.

The groove 12a is followed by a rib 12b having a radius of curvature equal to the groove 9b in the flank 9, a groove 12c adapted to accommodate the rib 9c, and finally a curved end portion 12d adapted to lodge within the groove 9b of complementary curvature.

The flank 13 has the same inclination as the ramp 8a in assembly as shown, the terminates in an outwardly extending locking rib 13b conforming to the profile of the groove 8b in the flank 8.

The clip fixing shown in FIG. 1, is in assembly holding under tension a thin film 6. To assume the assembled position the film 6 is received its initial tension by being passed over the lower extremity of the two flanks 12 and 13 of the channel 4, and the channel 4 is then moved so that the rib 9a engages the groove 12a, with the enlarged portion 13b sitting on the top of the flank 8 with the film 6 interposed therebetween.

The channel 4 is then pivoted on the rib 9a in a counter-clockwise movement, and initial tension in the film 6 is then produced since it is forced to slide over the surface of the rib 9a, and at the end of the pivoting motion the two ribs 12b and 12d are locked into the bottom of the respective grooves 9b and 9d and the ribs 13b in the groove 8b.

With this arrangement it will be seen that, in assembly, the upper surface of the knuckle 9a over which the film 6 passes, is exposed to direct radiation and due to the transparency of the film 6, the sun's rays 40, passing through the film, are caused to heat the material of the clip, this thermal variation being transmitted to the plastics film which in conjunction with the sun's U.V. radiation causes relaively rapid ageing in this area.

Figure 2:
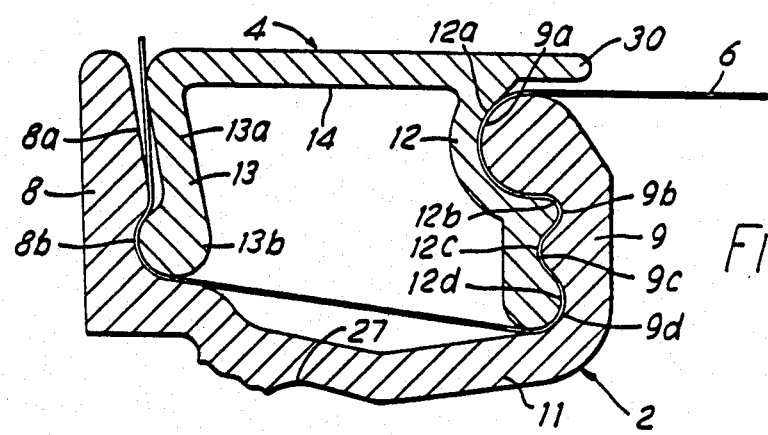
FIG. 2 is a cross-sectional view of a clip fixing for thin plastics film provided with a radiation protective shield according to an embodiment of the invention.

This problem is solved by the arrangement shown in FIG. 2, wherein the base member 14 of the channel 4, is provided with an integrally formed extension 30 extending over that surface of the knuckle 9a which is in contact with the thin film 6, thereby forming a shield protecting the knuckle 9a from the sun's rays. Even at very shallow angles of incidence it is impossible for the sun's rays to strike the knuckle 9a with which the film is in contact.

The design of the shield 30 has been carried out so that it also further improves the security of the fastening action of the clip.

In the original design shown in FIG. 1, the channel 4 is locked in place, as explained earlier, by the interaction of the outwardly extending locking rib 13b on the channel 4 with the locking groove 8b in the channel 2, and the tension imparted to the thin film, causing the locking mechanism to act dynamically by pinching the film even harder between the locking groove 8b and the rib 13b and between the underside of the knuckle 9a and the top of the projecting rib 12b.

Due to the presence of the shield 30, without the use of excessive force, it would be extremely difficult to remove the channel 4 in the normal way, the normal way being to pivot the upper channel 4 around the knuckle 9a until the flank 13 of the channel 4 clear the top of the insertion ramp 8a of the channel 4, at which point the channel 4 may be lifted clear of channel 2.

If this procedure is attempted with the design shown in FIG. 2 incorporating the protective shield 30, the protective shield 30 will collide with the tensioned film 6 making further rotation of the channel 4 difficult, without the use of substantial force.

Figure 4:
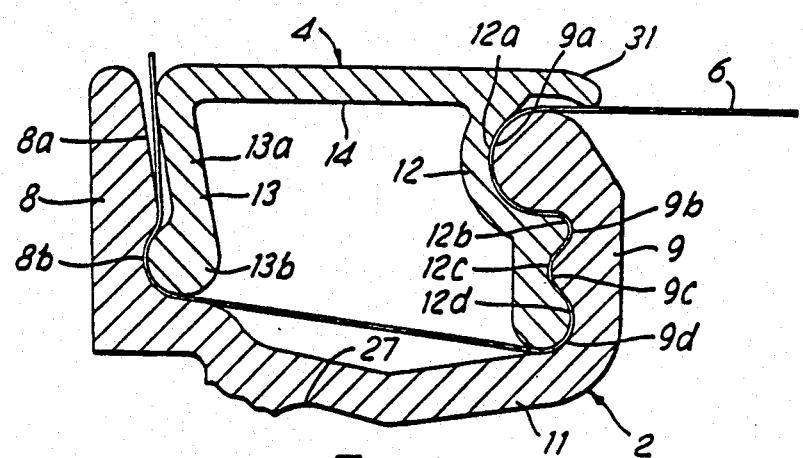
FIG. 4 is a cross-sectional view of a retaining and tensioning clip fixing for thin plastics film according to another embodiment of the invention provided with a radiation protective shield.

Another embodiment of the invention is illustrated in FIG. 4 which shows the incorporation of an integrally formed protective shield 31 with the channel 4, so shaped that its terminal edge contacts the film 6 in the assembled position of the channels 2 and 4, thereby achieving a tighter seal around the film in order to prevent the possible build-up of foreign matter between the shield and the film, as may happen in the FIG. 2 embodiment.

This in no way reduces the effectiveness of the shield as the material in contact with it, and although it will achieve the same temperatures as the shield, is not simultaneously exposed to direct solar radiation.

Figure 3:
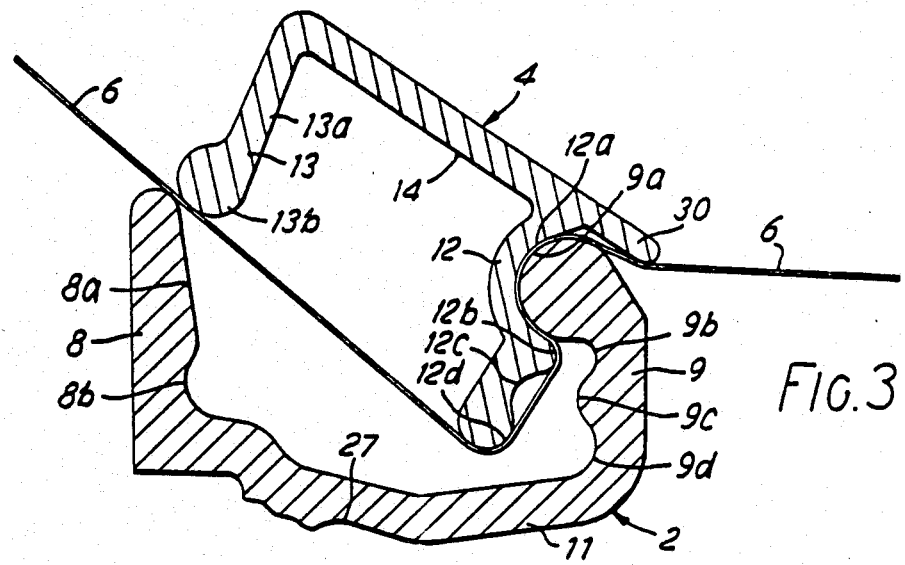
FIG. 3 is a cross-sectional view of the clip fixing of FIG. 2 showing the components of the clip fixing in the course of assembly.

Using these designs the system is still easily demountable and the film can simply be replaced if required. When the frame is being glazed the upper inverted channel 4 will still be able to rotate into position around the knuckle 9a; the film 6 not being under full tension the protective shield 31 will simply depress the film during the process of glazing, and this is illustrated in FIG. 3.

Figure 5:
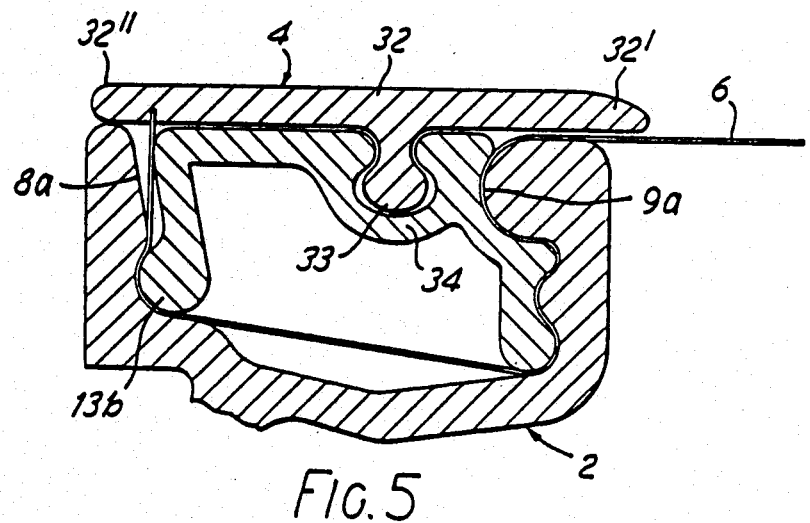
FIG. 5 is a cross-sectional view of a retaining and tensioning clip fixing for thin plastics film according to another embodiment of the invention.

A further embodiment of the invention is shown in FIG. 5. Here the protective shield is in the form of a replaceable cap 32 extending across the upper extremities of the flanks 8 and 9 thus shielding both the knuckle 9a and the exposed ramp 8a and exterior surface of the flank 13a of the inverted channel 4, by cap portions 32' and 32" respectively.

The cap 32 is provided with a protuberance 33 engaging a corresponding complementary recess 34 in the inverted channel 4 in compression fit. In this embodiment the cap 32 is made of plastics, rubber neoprene, or even a soft metal such as to provide a deformable protuberance 33 which can be inserted by a press fit action into the recess 14.

Figure 6:
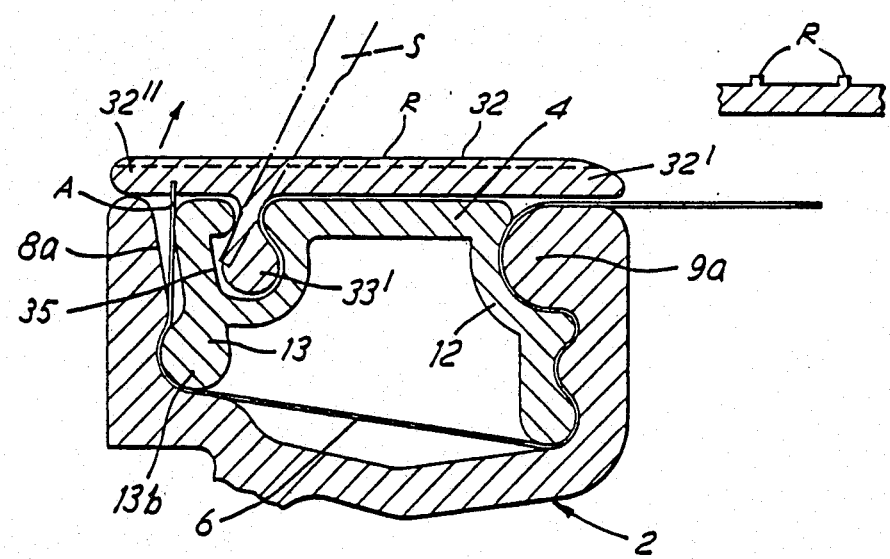
FIG. 6 is a cross-sectional view of a retaining and tensioning clip fixing for thin plastics film according to a still further embodiment of the invention.

Alternatively the inverted channel 4 may be provided with a recess 35 of the design shown in FIG. 6 to receive the protuberance 33' formed in the cap 32. In this embodiment the base of recess 35 is oversized in part with respect to the protuberance 33', to enable, after removal of the cap 32, the insertion of the screwdriver or special tool S shown in dotted outline in FIG. 6, readily to help the inverted channel 4 to be removed from the channel 2 when required, especially when using the thicker range of thin plastic films. This recess can also be used to aid assembly.

The recess 35 is formed adjacent the flank 13 of channel 14, to provide required leverage with screwdriver S or special tool in order to remove inverted channel 4 by lifting flank 13 with a clockwise rotation about knuckle 9a.

With the recess 35 positioned adjacent to the flank 13 of channel 14, in order to prevent the possible build-up of foreign matter or wind or ice under the cap at 32', it is necessary to extend the cap as shown at 32" in order to provide the necessary counter leverage.

Additionally the cap 32 of FIG. 5 or FIG. 6, is provided with transverse ribs R which act to resist wind pressure tending to lift the cap 32 of the channel 4.

Figure 7:
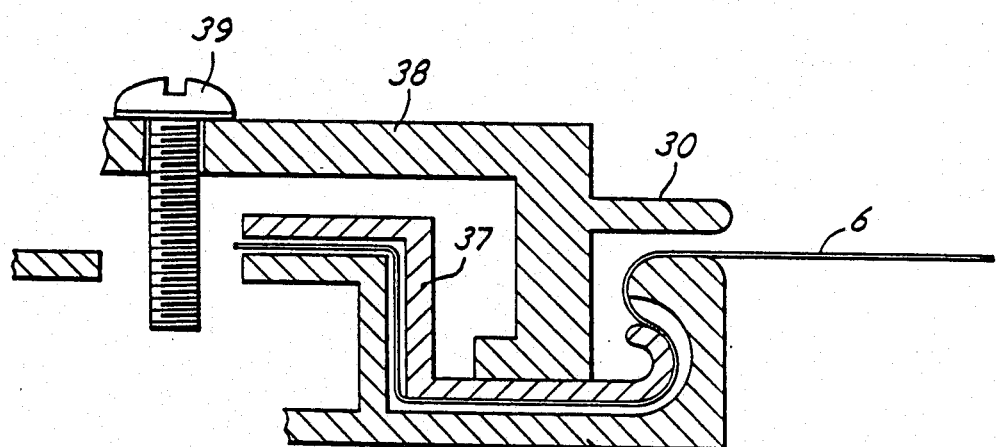
FIG. 7 is a cross-sectional view of a more basic clip fixing requiring at least three component parts.

Another embodiment of the invention is shown in FIG. 7. This basic clip fixing requiring at least three component parts in a lower channel 36, a cooperating member 37 and either screws or clips to retain parts 36 and 37 in assembled cooperation retaining the film 6. Using this clip fixing type, adjacent glazed frames may be attached to suitable structure using cover strips 38, by means of mechanical fastening e.g. screws 39. To provide the necessary protective shield 30 in this case, it is easier to make it part of the cover strip 38 and not an integral part of the clip fixing.

The present invention has been explified by reference to modification of the clip of U.K. Pat. No. 1,586,247. However, it will be appreciated by those skilled in the art that the invention would be equally useful in other tensioning clips in general use where similar problems of localised degeneration of the thin plastics glazing of film occurs.

What is claimed is:

1. Retaining the tensioning element for a thin planar plastic film including at least one elongated channel portion having a generally U-shaped cross-section provided with first and second flanks joined by a first core member, an elongated inverted channel member having a generally U-shaped cross-section provided with third and fourth flanks joined by a second core member, said second core member having a bottom surface on the inside of said U-shaped inverted channel member, said inverted channel member being dimensioned to be received within said channel portion, the film being respectively received and pinched between said first and third and second and fourth flanks upon assembly of said inverted channel member with said channel portion, wherein the internal profile of said first flank provides a rounded inwardly-projecting rib means proximate the open side of said channel portion for forming a first rounded knuckle surface means and the external profile of said third flank provides a groove means proximate said second core member for forming a second rounded knuckle surface means complementary in shape to said first rounded knuckle surface means for sliding on film extending across said first rounde knuckle surface means and thereby pivoting said channel member thereon during assembly of said channel members to pinch said film therebetween, and wherein said second flank exhibits a cross-section of internal profile which includes an insertion ramp sloping inwardly from an open side of said U-shaped channel portion followed by a curved locking groove proximate said first core member and said fourth flank exhibits a cross-section of external profile which includes an elongated portion extending laterally away from said second core member, said elongated portion having at the outer end thereof, proximate the open side of said inverted channel member, a locking-rib means protruding laterally outwardly from said fourth flank for engaging said locking groove, said locking rib being substantially laterally spaced from the bottom surface of said second core a distance at least as great as the thickenss of the second core, said locking-rib means and said locking groove being complementary one to the other, with said locking-rib means having the function of pinching said film between its surface and said insertion ramp during assembly of said channel members, and between its surface and said locking-groove surface once said channel members are assembled, wherein when said channel portion and said inverted channel member are fully engaged, with ends of said core of said inverted channel member being in an approximately horizontal attitude, said knuckle surface means of said inverted channel member is above the locking-rib means of said inverted channel member with said knuckle surface means being proximate said core of said inverted channel, but said locking-rib means being substantially spaced from said core;

said retaining and tensioning element further comprising a sunlight-radiation shielding member attached to said inverted channel member at said second core member, said sunlight-radiation shielding member extending laterally outwardly, significantly beyond all points at which said plastic film contacts said first flank to thereby prevent direct sunlight from falling on all said points at which said plastic film contacts said first flank.

2. A retaining and tensioning element as in claim 1 wherein said sunlight-radiation shielding member is significantly spaced above the upper end of said first flank and a plastic film stretched across said upper end of said first flank to be spaced therefrom and thereby allow a flow of air therebetween.

3. A retaining and tensioning element as in claim 2 wherein a laterally outer end of said sunlight-radiation shielding contacts said plastic stretched across said upper end of said first flank at a position spaced substantially laterally outwardly from all points of contact of said plastic film with said first flank.

4. A retaining and tensioning element as in claim 1 wherein said sunlight-radiation shielding member is releasably attached to said inverted channel member.

5. A retaining and tensioning element as in claim 4 wherein the attachment of said sunlight-radiation shielding member to said inverted channel member includes a slot in an upper surface of the second core into which a protrusion of said sunlight-radiation shielding member is insertable to be selectively held therein by a force fit.

6. A retaining and tensioning element as in claim 5 wherein said slot in the upper surface of said second core is nearer to said fourth flank than to said third flank and is shaped for receiving an elongated tool which can be rotated thereby rotating the inverted channel member to aid in removal or insertion of the inverted channel member from and to the channel member.

7. A retaining and tensioning element as in claim 1 wherein said inverted channel member includes thereon a tool engaging means for engaging an elongated tool for aiding in the insertion and removal of said inverted channel member to and from said channel member.

8. A retaining and tensioning element as in claim 7 wherein said tool engaging means comprises a slot formed in the upper surface of said second core for receiving a screwdriver-like tool therein to aid in the pivoting of said inverted channel member at said knuckle surface means of said channel member and thereby aiding in the insertion and removal of said inverted channel member to and from said channel member.

9. A retaining and tensioning element as in claim 8 wherein said slot is nearer said fourth flank than said third flank.

* * * * *